(12) United States Patent
Girao et al.

(10) Patent No.: US 8,340,301 B2
(45) Date of Patent: Dec. 25, 2012

(54) METHOD FOR ESTABLISHING A SECRET KEY BETWEEN TWO NODES IN A COMMUNICATION NETWORK

(75) Inventors: Joao Girao, Ludwigshafen (DE); Frederik Armknecht, Worms (DE); Alfredo Matos, Aveiro (PT); Rui Luis Aguiar, Aveiro (PT)

(73) Assignee: NEC Europe, Ltd., Heidelberg (DE)

( * ) Notice: Subject to any disclaimer, the term of this patent is extended or adjusted under 35 U.S.C. 154(b) by 655 days.

(21) Appl. No.: 12/375,990

(22) PCT Filed: Jul. 30, 2007

(86) PCT No.: PCT/EP2007/006724
§ 371 (c)(1),
(2), (4) Date: Apr. 27, 2009

(87) PCT Pub. No.: WO2008/014958
PCT Pub. Date: Feb. 7, 2008

(65) Prior Publication Data
US 2010/0008508 A1 Jan. 14, 2010

(30) Foreign Application Priority Data
Aug. 1, 2006 (DE) .......... 10 2006 036 165

(51) Int. Cl.
*H04L 29/06* (2006.01)
(52) U.S. Cl. .................. 380/278; 380/45; 380/277
(58) Field of Classification Search .......... 380/45–49, 380/278–283
See application file for complete search history.

(56) References Cited

U.S. PATENT DOCUMENTS

| | | | |
|---|---|---|---|
| 5,590,200 A * | 12/1996 | Nachman et al. | 380/46 |
| 6,260,147 B1 * | 7/2001 | Quick, Jr. | 713/182 |
| 2003/0031320 A1 * | 2/2003 | Fan et al. | 380/255 |
| 2003/0068047 A1 | 4/2003 | Lee et al. | |
| 2004/0078564 A1 * | 4/2004 | Abdulhayoglu | 713/156 |

(Continued)

FOREIGN PATENT DOCUMENTS

| GB | 2 390 270 | 12/2003 |
|---|---|---|
| WO | 00/25475 | 5/2000 |

OTHER PUBLICATIONS

Atwood, Jeff. "Brute Force Attacks are for Dummies." Jul. 10, 2006. p. 1-2.*

(Continued)

*Primary Examiner* — Philip Chea
*Assistant Examiner* — Kendall Dolly
(74) *Attorney, Agent, or Firm* — Young & Thompson

(57) ABSTRACT

A method for establishing a secret key between two nodes in a communication network, in particular in a wireless local area network (WLAN), includes concealment of the fact that a key exchange occurs, one of the nodes—first node (B)—broadcasts one or more packets ($P_i$) that can be received by the other node—second node (A)—, wherein the packets ($P_i$) contain each a first key ($K_i$) and wherein the packets ($P_i$) are each encrypted with a second key ($k_i$) before being sent, the second node (A) randomly chooses one packet ($P_m$) from the packets ($P_i$) received and breaks the encryption of the chosen packet ($P_m$) in order to obtain the first key ($K_m$), and the second node (A) initiates a key exchange protocol, wherein the second node (A) encrypts the message to be sent for initiating the key exchange protocol with the revealed key ($K_m$).

14 Claims, 1 Drawing Sheet

U.S. PATENT DOCUMENTS

2005/0050340 A1* 3/2005 Lee .............................. 713/189
2005/0129243 A1  6/2005 Bousis

OTHER PUBLICATIONS

International Search Report dated Nov. 27, 2007, from corresponding PCT application.

Shigeo Tsujii and Masao Kasahara, "Cryptography and Information Security", Japan, Shokodo Co., Ltd., Feb. 20, 1996, 4th printing of 1st edition, pp. 72-74.

Japanese Office Action, dated Aug. 12, 2011, in Application No. 2009-522155.

* cited by examiner

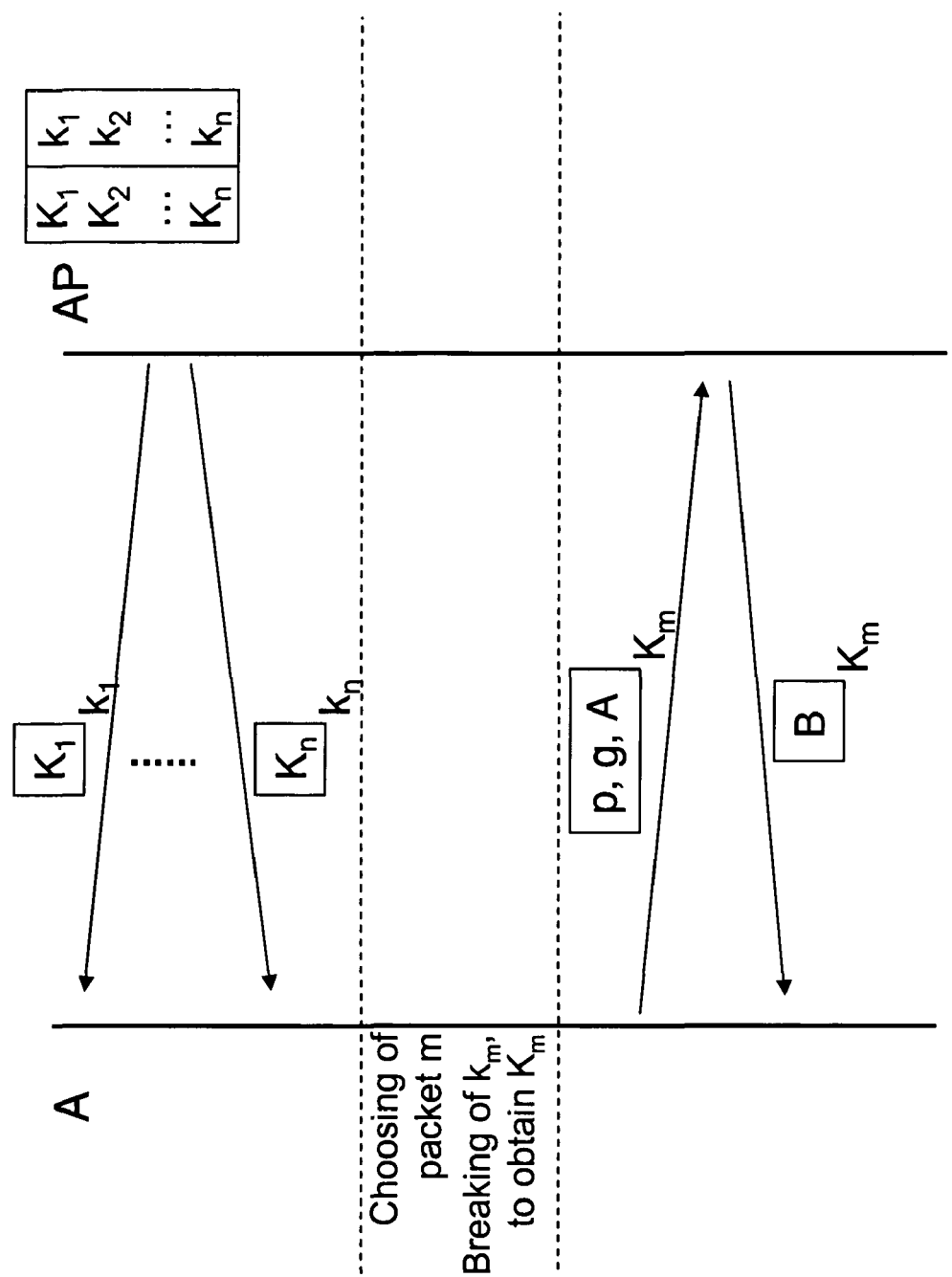

METHOD FOR ESTABLISHING A SECRET KEY BETWEEN TWO NODES IN A COMMUNICATION NETWORK

BACKGROUND OF THE INVENTION

The present invention relates to a method for establishing a secret key between two nodes in a communication network, in particular in a wireless local area network (WLAN).

In order to establish a secret key between two nodes in a communication network key exchange protocols are commonly used. Known key exchange protocols are, for example, the Diffie-Hellman algorithm, in particular Diffie-Hellman on elliptic curves, or RSA based methods. The security of the known methods is based on the application of so-called one-way functions. In this sense, the Diffie-Hellman algorithm uses the fact the raising to a power operation is a very simple computation operation, but that in contrast the computation of the discrete logarithm of a number is only possible with extremely high effort.

After having performed the known methods, the parties A and B involved in the algorithm dispose of a secret key K which only they will know. But in case of the known methods the key exchange itself is not kept secret which can turn out to be disadvantageous in certain environments. The initiating party, for example, when performing the Diffie-Hellman key exchange first has to transmit two values over the insecure medium. In the common notation this is a prime number p, as well as a generator g, on the base of which the shared key $K_{DH}$ can then be computed according to $K_{DH} = (g^a \mod p)^b \mod p = (g^b \mod p)^a \mod p$. The variables a and b denominate random numbers chosen by the parties. Only due to the fact of transmitting a message with the values g, p, as well as generally also $A = g^a \mod p$ over an insecure medium, an attacker intercepting this message can already draw certain conclusions, for example, in the simplest case, the fact that a key agreement is occurring and who is the initiating party.

SUMMARY OF THE INVENTION

It is therefore an object of the present invention to improve and further develop a method of the initially described type for establishing a secret key between two nodes in a communication network in such a way that the fact a key exchange is occurring is concealed.

In accordance with the invention, the aforementioned object is accomplished by a method characterized in
that one of the nodes—first node—broadcasts one or more packets that can be received by the other node—second node—, wherein the packets contain each a first key and wherein the packets are each encrypted with a second key before being sent,
that the second node randomly chooses one packet from the packets received and breaks the encryption of the chosen packet in order to obtain the first key, and
that the second node initiates a key exchange protocol, wherein the second node encrypts the message to be sent for initiating the key exchange protocol with the revealed key.

According to the invention, it has first been recognized that a concealment of the key exchange can overall be achieved by performing a protocol where cryptographic elements (encryption of data) and steganographic elements (making data invisible) are combined with each other. The steganographic element concretely consists in the fact that one of the nodes broadcasts one packet or a multitude of packets, wherein the packets contain each a first key and wherein the packets are each encrypted with a second key before being broadcasted. The packets can be received by a second node which chooses randomly one packet from the received packets. By running a brute force attack, the second node breaks the encryption of the chosen packet and obtains thus the first key which has been transported with the packet. In a next step the revealed key is used by the second node to initiate a key exchange protocol. Concretely, the second node encrypts the message, which has to be sent in order to initiate the key exchange protocol, with the revealed key.

In case of the method according to the invention only encrypted messages are broadcasted over a public medium, for example a public broadcast link, whereby an attacker does not have any possibility to find out that the messages are part of a key exchange protocol or serve to initiate a key exchange protocol. Even if the attacker is able to decrypt a packet, the thus gained information itself, i.e. without that the attacker has to invest (considerable) further efforts, is deemed to be worthless, because the attacker does not know which packet the other node will randomly choose from the multitude of packets.

In order to further increase security, it may be provided that the steganographic element is reinforced by inserting a waiting time of pre-definable duration between the sending of the packet(s) containing the first keys by the first node, and the breaking of the encryption or the initiation of the key exchange by the second node. During this time, the rest of the nodes of the network exchange encrypted messages in the context of their ordinary communication and make it even more difficult for an attacker to find out anything about an occurring key exchange.

In the context of an advantageous embodiment it is provided that the first node stores a list with the first keys sent. When the first node receives the message initiating the key exchange protocol sent by the second node, the first node can go through the list trying to decrypt the message received with one of the stored keys. When the first node has found out the key with which the message initiating the key exchange protocol was encrypted, it can be provided in a next step that the first node employs the found key to encrypt its message of the key exchange protocol from its side. In an alternative embodiment, it may be provided to attach an identifier to the message which can be recovered by the other party but not by an attacker. For this purpose, for example, a random number identifying the respective key used could be employed.

The second keys with which the first node has encrypted the sent packets are designed in an advantageous way as encryptions that are easy to break. The fact that an attacker can easily break a light-weight encryption when the packets are transmitted over a public channel is not relevant in the sense that he does not gain any information in spite of the decryption, because he does not know which packet the second node will choose from the multitude of the sent packets.

Regarding a flexible application of the method, it can be provided that the length of the keys with which the first node encrypts the packets are defined according to the respective security requirements. In a concrete example, a RC5 encryption could be chosen, wherein a RC5 encryption with a key length between 16 and 64 bits is assumed to be appropriate in a multitude of possible applications.

Regarding a simplification, it can be provided that the first key $K_i$ that is in each case transported with a packet, and the second key $k_i$ used to encrypt the corresponding packet are chosen to be identical.

In the context of a concrete application scenario one of the nodes can, for example, be an access point of a network. The other node can be a node associated with or a node associating with the access point, wherein the described method can run between the access point and the node in the context of the registration of the node at the access point.

Regarding a further increase in security, it can be provided that the packets are broadcasted periodically. This again reinforces the steganographic element, because the procedure is executed independently from the fact whether a new node registers with the network. It is hence impossible for an attacker to find out when a key exchange starts, because the process of sending packets is completely uncoupled from any association procedures of nodes in the network. In order to avoid unnecessary data traffic, in particular when applying to a WLAN, it may be provided that the packets to be sent by the first node are beacons that are sent anyway at regular time intervals of typically 100 milliseconds. In other words, the first key $K_i$ to be transported by the packet is integrated in an unused field of the beacon.

Alternatively, it is possible to append the first keys $K_i$ to all packets that are sent within the network.

Also in the context of a concrete application scenario it may be provided that the initiated key exchange is a Diffie-Hellman key exchange. Other methods, as for example RSA, can also be envisioned.

BRIEF DESCRIPTION OF THE DRAWING

There are several ways how to design and further develop the teaching of the present invention in an advantageous way. To this end, it is to be referred to the patent claims herein and to the following explanation of preferred embodiments of the invention by way of example, illustrated by the FIGURE. In connection with the explanation of the preferred embodiment of the invention by the aid of the FIGURE, generally preferred embodiments and further developments of the teaching will we explained. In the drawing, the only FIGURE shows schematically an example of an embodiment of the method according to the invention for establishing a secret key between an access point and an associated node.

The only FIGURE shows—schematically—an example of an embodiment of a method according to the invention on the basis of an access point AP of a wireless local are network and an associated node A.

DESCRIPTION OF PREFERRED EMBODIMENTS

In a first step the access pint AP generates a multitude of packets $P_i$. The packets $P_i$ contain each a first key $K_i$. The access point AP encrypts each of the packets $P_i$ with a second key $k_i$ and sends the packets $P_i$ encrypted in such a way over the wireless link, so the packets $P_i$ can be received by the node A. In the concretely shown embodiment the packets $P_i$ are encrypted with the block cipher RC5.

In a next step the node A chooses from the multitude of received packets $P_i$ randomly a packet $P_m$. By running a brute force attack the node A breaks the encryption of the chosen packet $P_m$ to thereby obtain the key $K_m$. The brute force attack can be performed with reasonable efforts because the packets $P_i$ have been encrypted by the access point AP with a relatively weak encryption.

In a third step the node A uses the found key $K_m$ to initiate a key exchange protocol with the access point AP. In the depicted embodiment, the key exchange protocol follows the known Diffie-Hellman algorithm. Specifically, the node A generates in a way known by itself the prime number p, as well as a generator g with $2 \leq g \leq p-2$. The node A sends a message which contains the values g, p and A, wherein the value A is to be computed as follows: $A=g^a \bmod p$. a is a random number chosen by the node A that is not made public. The message with the values g, p, A is transmitted in an encrypted manner, wherein the node A employs the found key $K_m$ to encrypt the message.

The access point AP decrypts the message received by the node A, wherein in the shown embodiment, the access point AP has stored a table containing all first keys $K_i$ sent with the packets $P_i$. The access point AP accesses the table and tests one key after the other until it hits the key $K_m$ with which the decryption is successful. Thereupon the access point AP on its part generates a random number b and computes $B=g^b \bmod p$ and sends the value B encrypted with the found key $K_m$ to the node A.

Finally, the new key $K_{DH}$ is computed, on the part of the node A according to $B^a \bmod p$ and on the part of the access point AP according to $A^b \bmod p$, wherein the new key $K_{DH}$ then serves to encrypt the forthcoming data exchange between the node A and the access point AP.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. Method for establishing a secret key between two nodes in a communication network, in particular in a wireless local area network (WLAN), comprising:
    first node (B) broadcasting one or more packets ($P_i$) that can be received by second node (A), wherein the packets ($P_i$) contain each a first key ($K_i$) and wherein the packets ($P_i$) are each encrypted with a second key ($k_i$) before being sent,
    the second node (A) randomly choosing one packet ($P_m$) from the packets ($P_i$) received and breaks the encryption of the chosen packet ($P_m$) in order to obtain the first key ($K_m$), and
    the second node (A) initiating a key exchange protocol, wherein the second node (A) encrypts the message to be sent for initiating the key exchange protocol with the revealed first key ($K_m$),
    wherein the encryption of the packets ($P_i$) with the second ($k_i$) is an encryption that is broken by a brute force attack comprising a multiplicity of decryption attempts, and
    wherein the second node (A) breaks the encryption of the chosen packet ($P_m$) in order to obtain the first key ($K_m$) without having the second key ($k_i$).

2. Method according to claim 1, wherein between sending the packets ($P_i$) by the first node (B) and breaking the encryption or initiating the key exchange by the second node, a pre-configurable duration is provided for.

3. Method according to claim 1, wherein the first node (B) stores a list of the sent first keys ($K_i$).

4. Method according to claim 3, wherein the first node (B) tests the stored first keys ($K_i$) in order to decrypt the message of the second node (A) initiating the key exchange protocol.

5. Method according to claim 4, wherein the first node (B) encrypts its message of the key exchange protocol with the found first key ($K_m$).

6. Method according to claim 1, wherein a length of the second key ($k_i$) is set according to an encryption breakable with a multiplicity of decryption attempts.

7. Method according to claim 1, wherein a RC5 encryption is employed for encrypting the packets ($P_i$).

8. Method according to claim 1, wherein the first key ($K_i$) transported with the packet ($P_i$) and the second key ($k_i$) used to encrypt the packet ($P_i$) are identical.

9. Method according to claim 1, wherein one of the nodes (A, B) is an access point (AP) of a network, and that the other of the nodes (B, A) is a node associated with said access point (AP).

10. Method according to claim 1, wherein the packets ($P_i$) are sent periodically.

11. Method according to claim 1, wherein the packets ($P_i$) are beacons broadcast at defined times.

12. Method according to claim 1, wherein the initiated key exchange protocol is a Diffie-Hellman key exchange.

13. Method according to claim 2, wherein the first node (B) stores a list of the sent first keys ($K_i$).

14. Method according to claim 2, wherein a length of the second key ($k_i$) is set according to an encryption breakable with a multiplicity of decryption attempts.

* * * * *